United States Patent
Madsen et al.

(10) Patent No.: US 7,428,318 B1
(45) Date of Patent: Sep. 23, 2008

(54) METHOD FOR CAPTURING, MEASURING AND ANALYZING MOTION

(75) Inventors: Nels H. Madsen, Auburn, AL (US); Ronnie J. H. Wilmink, Marietta, GA (US); Thomas M. McLaughlin, Marietta, GA (US)

(73) Assignee: Motion Reality, Inc., Marietta, GA (US)

(*) Notice: Subject to any disclaimer, the term of this patent is extended or adjusted under 35 U.S.C. 154(b) by 822 days.

(21) Appl. No.: 11/011,540

(22) Filed: Dec. 13, 2004

Related U.S. Application Data

(60) Provisional application No. 60/528,666, filed on Dec. 11, 2003, provisional application No. 60/528,880, filed on Dec. 11, 2003, provisional application No. 60/528,735, filed on Dec. 11, 2003.

(51) Int. Cl.
*G06K 9/00* (2006.01)
(52) U.S. Cl. .................... 382/107; 348/154; 348/155

(58) Field of Classification Search ............... 382/103, 382/107, 326; 348/14.1, 97, 154, 155, 208.4, 348/208.13, 208.16, 352, 407.1
See application file for complete search history.

(56) References Cited

U.S. PATENT DOCUMENTS

| | | | | |
|---|---|---|---|---|
| 5,479,526 A | * | 12/1995 | Benton et al. | 382/103 |
| 5,969,755 A | * | 10/1999 | Courtney | 348/143 |
| 6,278,466 B1 | * | 8/2001 | Chen | 345/473 |

* cited by examiner

*Primary Examiner*—Bhavesh Mehta
*Assistant Examiner*—Abolfazl Tabatabai
(74) *Attorney, Agent, or Firm*—King & Spalding

(57) ABSTRACT

A system and method for capturing, measuring and analyzing motion in real-time is provided which operates with or without markers. A threshold image is based on a background image and is created to minimize noise during the motion capture. A captured image is compared to the threshold image to identify collections of hot pixels or globs. The globs are compared to expected characteristics of the markers or the subject and are tracked between frames. Glob information is used to determine the location of the markers or subject in each frame.

7 Claims, 7 Drawing Sheets

METHOD FOR CAPTURING, MEASURING AND ANALYZING MOTION

RELATED APPLICATION

This application claims priority to U.S. Provisional Application No. 60/528,666 entitled "System and Method for Motion Capture," U.S. Provisional Application No. 60/528,880 entitled "System and Method for Measuring, Animating and Analyzing Motion," and U.S. Provisional Application No. 60/528,735 entitled "Camera for Measuring, Animating and Analyzing Motion," all of which were filed Dec. 11, 2003 and all of which are incorporated herein by reference.

TECHNICAL FIELD

The present invention is directed in general to providing a system and method for capturing and analyzing motion, and in particular to capturing motion using a background image and a threshold image.

BACKGROUND

Motion capture systems provide the ability to measure and analyze the motion of humans, animals, and mechanical devices. Once the motion is captured, it can be used for a variety of purposes. For example, the captured motion can be used to animate a computer-generated model of the subject so that the subject's motion can be analyzed or the motion can be used to animate a character created for a motion picture.

Ideally, a motion capture system captures the subject's motion without interfering with the subject's motion, analyzes the captured motion in real-time, and provides an accurate representation of the motion. However, current systems do not provide the real-time performance and accuracy demanded by many applications. Several currently available motion capture systems place markers on or near a subject's joints and then use small groups of markers to determine the position and orientation of the subject. One disadvantage of these types of systems is that the limitation on the position and number of the markers leads to accuracy problems. Another disadvantage is that the markers can interfere with the subject's motion.

Some currently available systems can provide accurate motion capture, but not in real-time. Those systems that provide real-time performance typically sacrifice accuracy or limit the type or scope of motion that can be analyzed. Thus, there is a need for a motion capture system that can accurately capture motion real-time.

SUMMARY OF THE INVENTION

The present invention provides a method for capturing, measuring and analyzing the motion of humans, animals, and mechanical devices in real-time. A background image is created that corresponds to the motion capture environment. The background image is used to create a threshold image. In one aspect of the invention, the threshold image is created using an auto thresholding feature. In the auto thresholding feature, each camera captures a series of images while the subject makes movements similar to the ones to be captured. This series of images is used to adjust the various threshold parameters, which are used to generate the threshold image for each camera. First, the center of the image for curvature falloff is determined. Once the center of the image is determined, the threshold intensity is lowered until the noise is too high. Noise includes hot spots and globs that are not associated with markers. The threshold intensity is then incremented until the noise is limited. After the threshold intensity is adjusted, the curvature is lowered until the peripheral noise is too high. The threshold intensity and the curvature are then incremented until the noise is limited across the field of view.

During motion capture, a captured image is compared to the threshold image on a pixel-by-pixel basis to locate hot pixels. A hot pixel is a pixel in the captured image that has an intensity greater than the corresponding pixel in the threshold image. Once the hot pixels are located, the pixels are analyzed to locate connected hot pixels (segments) and connected segments (globs). If the characteristics of the globs satisfy the characteristics of the markers (or the subject in a markerless capture), then the globs are selected for further analysis. The 3 D locations for the candidate points corresponding to the selected globs are determined and are used to track the positions of the candidate points between frames. The track attributes for the candidate points are compared to the expected attributes of the subject's motion and if there is a correlation, then the candidate points are used to determine the subject's motion.

These and other aspects, features and advantages of the present invention may be more clearly understood and appreciated from a review of the following detailed description of the disclosed embodiments and by reference to the appended drawings and claims.

DETAILED DESCRIPTION

Figure 1:
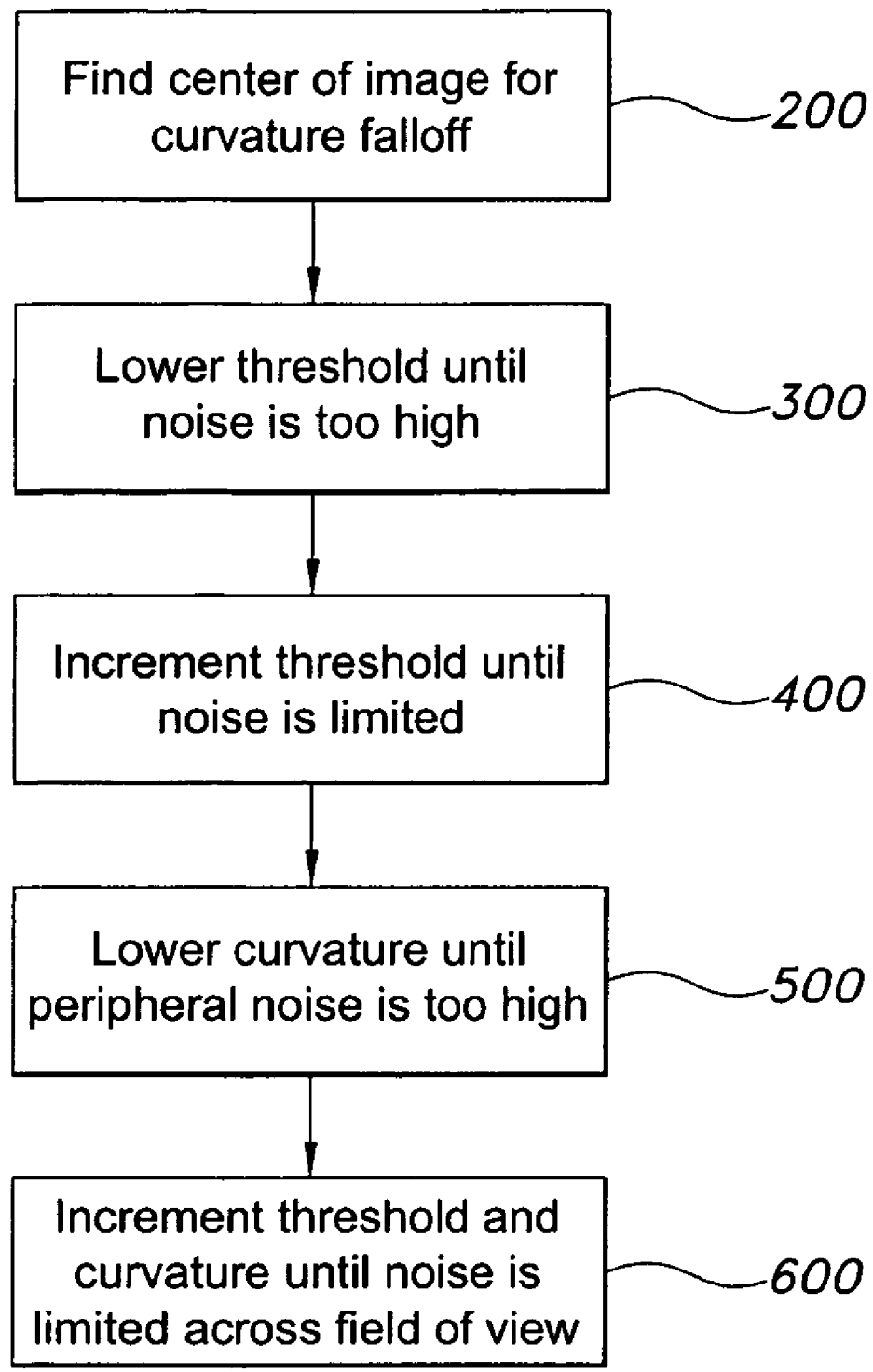
FIG. 1 is a flow diagram illustrating a method for auto thresholding in accordance with an embodiment of the invention.

The present invention provides a method for capturing, measuring and analyzing the motion of humans, animals, and mechanical devices in real-time. Briefly described, the present invention uses cameras to capture the movement of a subject. In one embodiment, markers are placed on the subject, while in another embodiment markers are not used. Images captured by the cameras are compared to a threshold image to identify collections of hot pixels or globs. The globs are compared to expected characteristics of the markers or the subject and are tracked between frames. Glob information is used to determine the location of the markers or subject in each frame.

The Motion Capture Environment

The system uses a number of high-speed cameras to capture information about the locations of the markers associated with the subject (or the location of the subject in a markerless embodiment) as the subject moves. The cameras support high-speed image capture, as well as high-speed image processing. The cameras are connected to each other, as well as to a central computer.

The cameras are synchronized so that their shutters open simultaneously. The shutter open time is variable and typically ranges from 1/1000 to 1/4000 of a second depending upon the speed of the motion to be captured. The shutters can be triggered by a signal from the central computer or can be triggered using a synchronized clock signal within each camera. The frame rate is based on the motion to be captured and can be constant throughout the motion capture or can vary. For example, if a golf swing is being captured, the frame rate may be higher around the point of impact. A frame rate of 2000 frames per second could be used for the 10 frames before and the 10 frames after the club impacts the ball, and a frame rate of 200 frames per second could be used for the remaining frames.

A spotlight is attached to each camera and is aligned with the camera's line of sight so that the highly reflective material used for the markers appears very bright in the camera image. The images from the cameras are digitized and the brightness of each pixel is determined in order to identify bright regions in the image. The locations of the bright regions, as well as other characteristics of the regions are used to determine the locations of the markers.

Typically, the cameras are placed around the room. Each camera determines 2 D coordinates for each marker that it sees. The coordinate information for each marker from the cameras is calibrated so that the 2 D coordinates are transformed into 3 D coordinates. The cameras can be calibrated by moving a single marker throughout the motion capture area. Alternatively, the cameras can be calibrated by moving multiple wands having a small number of markers throughout the motion capture area. The fixed relative positions of the markers on the wand are used by the calibration process to quickly calibrate the cameras. As the subject moves, the cameras capture the motion and provide marker data, which describes the location of the markers in the 3 D space.

Background Image

A background image represents the motion capture environment and is calculated for each camera. The background image includes items that will be present throughout the motion capture, such as the other cameras and lights, and excludes the subject and any other objects that will be the subject of the motion capture. A number of images taken over a period of time are used to create the background image to accommodate fluctuations in the background. The majority of the images are acquired using the same shutter speed as will be used for the motion capture. The background image represents the maximum intensity of the acquired images. For a pixel having coordinates (x, y), the background image is defined as shown below.

$$BackGround(x,y) = \max\{Im1(x,y), Im2(x,y), \ldots, ImX(x,y)\}$$

To accommodate fluorescent lights, which fluctuate dramatically in intensity from frame to frame at fast shutter speeds, one of the images is acquired using a slower shutter speed. In one embodiment, a shutter speed of 8,333 microseconds is used since fluorescent lights cycle at 120 Hz. For this image, only the pixels that are at the maximum intensity are included. The remaining pixels are set to zero.

Once the background image is determined, pixels that are at the maximum intensity can be expanded so that one or more pixels surrounding the maximum intensity pixels are set to the maximum intensity to accommodate small fluctuations in the light intensity or small movements of the background objects. The amount of expansion is selectable via a configuration file. In one embodiment, the amount of expansion is one pixel.

The background image can be used to mask certain portions of the image, either totally or partially. To totally mask a portion of the image, the pixels corresponding to that portion of the image are set to the maximum intensity. To partially mask a portion of the image, the pixels corresponding to that portion of the image are set to an intensity that exceeds the expected brightness. Partially masking a portion of the image allows a marker to be detected, if the marker is located within the partially masked portion of the image since the intensity of the marker should exceed the intensity of the background image. Masking certain portions of the image, either totally or partially, helps speed the processing of the images.

Threshold Image

The background image is used to determine a threshold image. A threshold image includes pixel intensities and determines which portions of a motion capture image are used for further processing and which portions are discarded. For each pixel of the captured image, if the pixel intensity of the captured image is above the pixel intensity of the threshold image, then the pixel is used. If the pixel intensity of the captured image is not above the pixel intensity of the threshold image, then the pixel is discarded.

For a pixel having coordinates (x, y), an exemplary threshold image is based on certain threshold parameters (threshold, thresh_xc, thresh_yc, thresh_curve, thresh_bg) and is defined as shown below.

$$T(x,y) = \min(\text{maximum intensity}, \text{threshold}/(1 + [(x\text{-thresh\_}xc)^2 + (y\text{-thresh\_}yc)^2]/\text{thresh\_curve}^2) + bg(x,y)*\text{thresh\_}bg/100)$$

where threshold is the grey intensity that is added to the background image.

thresh_xc is the center x coordinate.

thresh_yc is the center y coordinate.

thresh_curve is the amount of curvature of the threshold image. In one embodiment, a setting of 400 indicates that pixels that are 400 pixels away from the center have an intensity that is half the intensity of the center threshold value.

bg(x,y) is the intensity of the pixel in the background image at coordinates (x,y).

thresh_bg is a percentage multiplier for the background image. For example, a value of 120 indicates that the threshold image intensity is 1.2 times the background image intensity.

Any pixel in the threshold image that is set to the maximum intensity is masked and will not be used for motion capture. Masking is typically used to mask stationary hot objects in the motion capture area, such as lights or reflective surfaces. The maximum intensity value depends upon the number of grey-scale bits used. For example, an 8-bit grey-scale provides values between 0 and 255, while a 10-bit grey-scale provides values between 0 and 1023.

A threshold image is independently created for each camera. Although a user can select the values of the five parameters used to calculate the threshold image, an auto thresholding feature is available and is described below.

Auto Thresholding

The objective of the auto thresholding feature is to generate values for the threshold parameters that yield a threshold image that is as low as possible without being so low that a lot of spurious globs, are generated. Stationary noise is eliminated by the thresh_bg parameter, which multiplies the background image by a certain factor to accommodate fluctuations in the scene and the CCD image noise. During auto thresholding the subject is in the motion capture area and is preferably moving in a manner similar to the motion to be captured.

A number of auto thresholding parameters are initially set by the user and are based on characteristics of the subject and/or the expected motion. In one embodiment, the parameter values are selected through trial and error to lower the number of iterations needed during auto thresholding. Shown below are exemplary auto thresholding parameters.

at_min_globs: minimum number of globs that need to be visible when the threshold is being lowered.

at_max globs: number of globs any camera should see. Used to determine whether the threshold is set too low.

at_max large_globs: number of globs over size at_max_area permitted in the field of view.

at_num frames: number of frames the auto thresholding routine can consume. The process will automatically terminate if this many frames have been used by the auto thresholding routine. Default is 1000, but can be set as low as 200. A larger number of frames allows for longer inspection of the scene, which is useful if the subjects are moving in the field of view.

at_radius: maximum distance for a glob to be considered as a center glob. Any globs further from the center are considered peripheral globs.

at_max_far_globs: maximum number of peripheral globs allowed in the field of view. This affects how the optimal curvature is determined.

at_max_area: maximum area or size of a glob that is allowed. No glob should be larger than this. If so, those globs are counted in the max_large_glob calculation.

at_threshold_step: percentage the threshold step size should be incremented or decremented.

at_curve_step: percentage the curvature should be incremented or decremented.

at_noise: maximum allowed noise in the field of view across several acquired images. Noise is defined as globs that flicker between subsequent images. A few flickering globs are allowed, but if there are too many, then the system will have to eliminate those noise markers based on triangulation errors it has to compute for each glob combination.

at_noise_iter: number of good iterations that have to occur during the noise elimination steps (steps 400 and 600 of FIG. 1). A good iteration is one in which the threshold parameters do not have to be modified (i.e. no noise was noticed). Defaults to 8.

at_cycles: number of frames (image taking cycles) to be taken within one iteration. Defaults to 6.

at_reset_cycles: if this parameter is set the good iterations counter is reset if at any point noise is detected. This effectively means that with this parameter set there needs to be at_noise_iter subsequent good iterations before an optimization step is terminated.

at_hang_up: specifies if the connection to the auto thresholding service should be terminated after the thresholding has finished. If this is not the case, it will immediately jump into a glob finding service without further intervention. Default is on.

at_modify_curve: allows for different ways in which the starting value for the curvature is found. With this parameter set to 0, auto thresholding will try to find a lowest setting for the curvature; with it set to 1 it will start with the curvature set to at_min_curve (configuration setting); with it set to 2 it will update the curvature setting to the lowest setting and in the subsequent stage only look for peripheral noise (ignoring the center noise) thus not incrementing the threshold value either; with it set at 3 the effect is the same as if set to 2, except that all noise in the field of view detected will increment the curvature setting. Default setting is 1.

at_min_curve: minimum curvature used as the lower starting point for thresh_curve if the at_modify_curve is set to 1 or higher. Default is 200.

at_keep_running: when set will complete all allowed frames for auto thresholding. If not, auto thresholding will finish as soon as enough good cycles have been completed. Default is on.

The auto thresholding parameters are used to calculate a threshold image. FIG. 1 illustrates the steps performed during auto thresholding. In step 200, the center of the subject's image for curvature falloff is determined. Once the center of the image is determined, the threshold intensity is lowered until the noise is too high in step 300. Once the noise is too high, the threshold intensity is incremented until the noise is limited in step 400. Once the noise is limited, the curvature is lowered until the peripheral noise is too high in step 500. Once it is determined that the peripheral noise is too high, then the threshold and curvature are incremented until the noise is limited across the field of view in step 600. Details of each of these steps are provided in connection with FIGS. 2-6.

Figure 2:
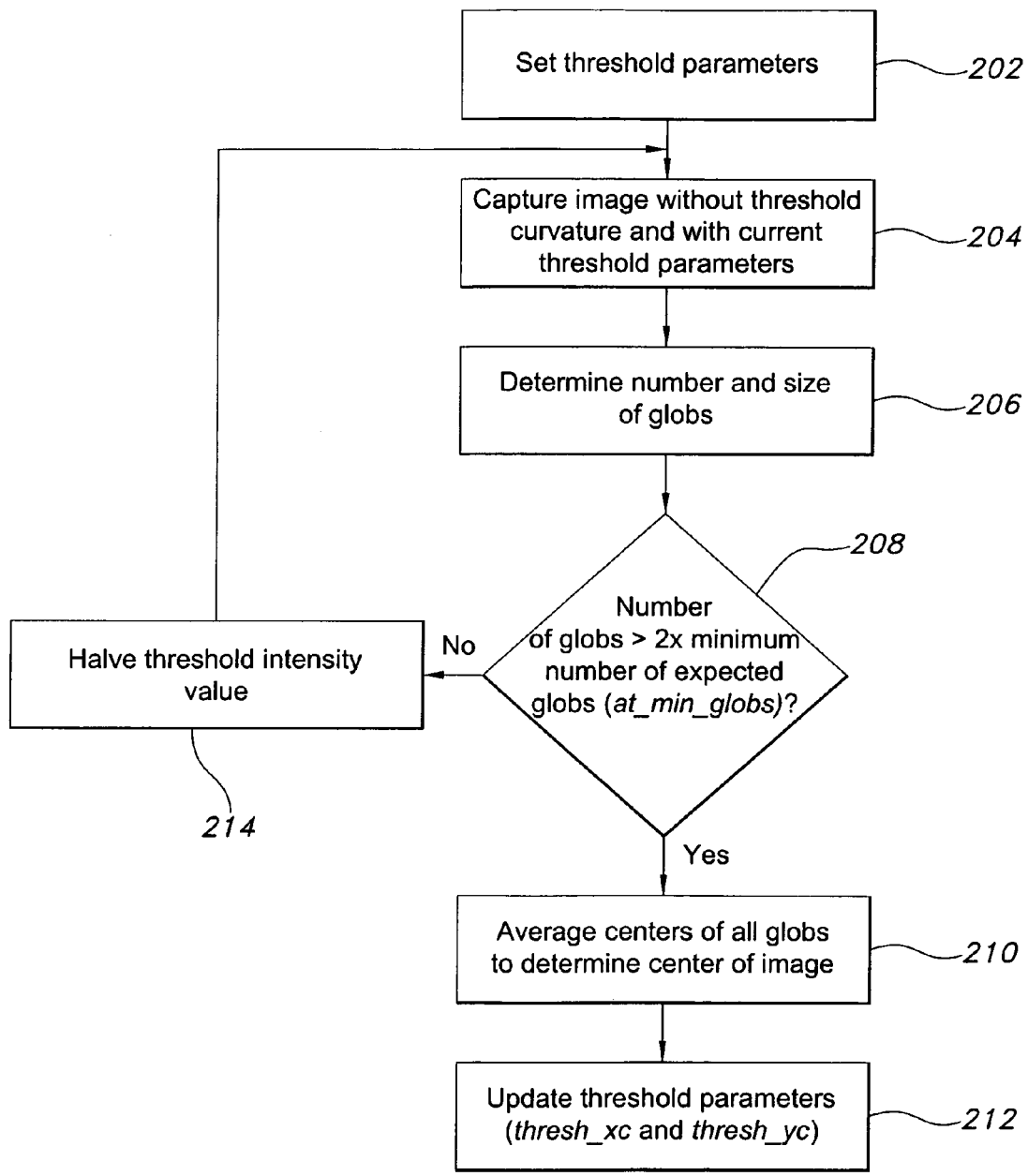
FIG. 2 is a flow diagram illustrating in more detail a portion of the auto thresholding method of FIG. 1, in accordance with an embodiment of the invention.

FIG. 2 provides additional details of finding the center of the image for curvature falloff. In step 202, the initial threshold parameters are set to establish an initial threshold image. The initial threshold parameters can be stored on the camera or updated from the central computer. The parameter values are determined empirically for the particular motion capture environment. In step 204, an image is captured. Typically the image is captured without threshold curvature and using the current settings for the threshold parameters. In step 206, the number and size of globs in the image are determined. A glob includes a number of connected hot segments and a hot segment includes a number of connected hot pixels. The method for determining or recognizing globs is described in the section entitled "Glob Detection" below. In step 208, a determination is made as to whether the number of globs is greater than two times the minimum number of expected globs, as specified by the at_min_globs parameter. If so, then the yes branch is followed to step 210 and the centers of all of the globs are averaged to determine the center of the image. Once the center of the image is determined, then the threshold parameters, thresh_xc and thresh_yc are updated in step 212.

If the number of globs is not greater than two times the minimum number of expected globs in step 208, then the method proceeds to step 214. In step 214, the threshold intensity values are halved. The method then returns to step 204 and captures another image.

Figure 3:
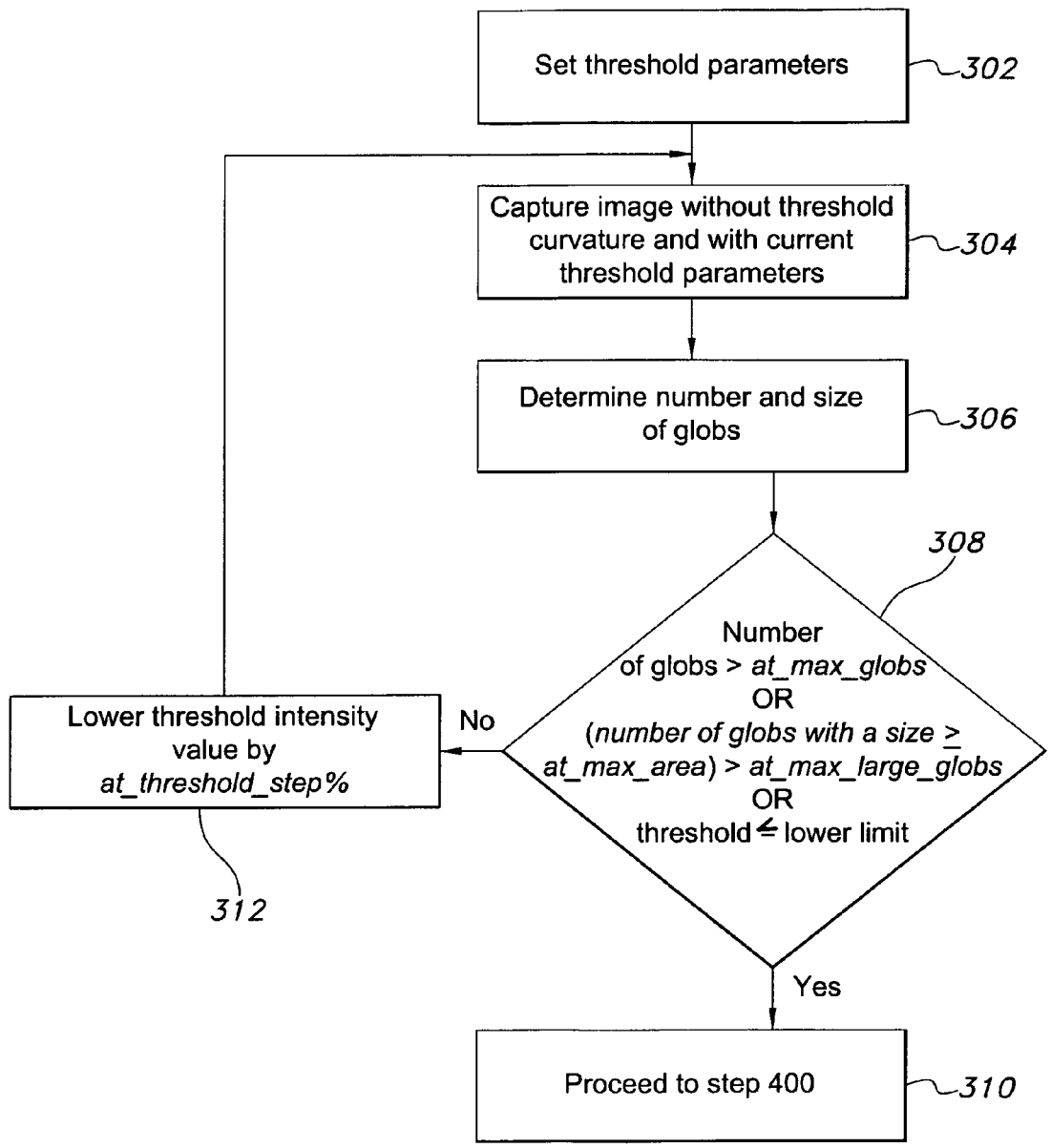
FIG. 3 is a flow diagram illustrating in more detail another portion of the auto thresholding method of FIG. 1, in accordance with an embodiment of the invention.

FIG. 3 provides additional details for the step of lowering the threshold intensity until the noise is too high. In step 302, the threshold parameters are set to the values used in step 202, i.e., the values are set to the values that were set prior to the start of auto thresholding. In step 304, an image is captured without threshold curvature using the current threshold parameters. In step 306 the number and size of the globs in the image is determined. In step 308, a determination is made as to whether the number of globs exceeds the expected number of globs (at_max_globs), the number of large globs exceeds the expected number of large globs (at_max_large_globs), or the threshold is at or below its lower limit. If any of these conditions are satisfied, then the threshold intensity is low enough. The yes branch is followed to step 310 and auto thresholding continues with step 400. If none of the conditions are satisfied, then the no branch is followed to step 312 where the threshold intensity is lowered by a predetermined value specified by at_threshold_step %. The method then returns to step 304 and repeats.

Figure 4:
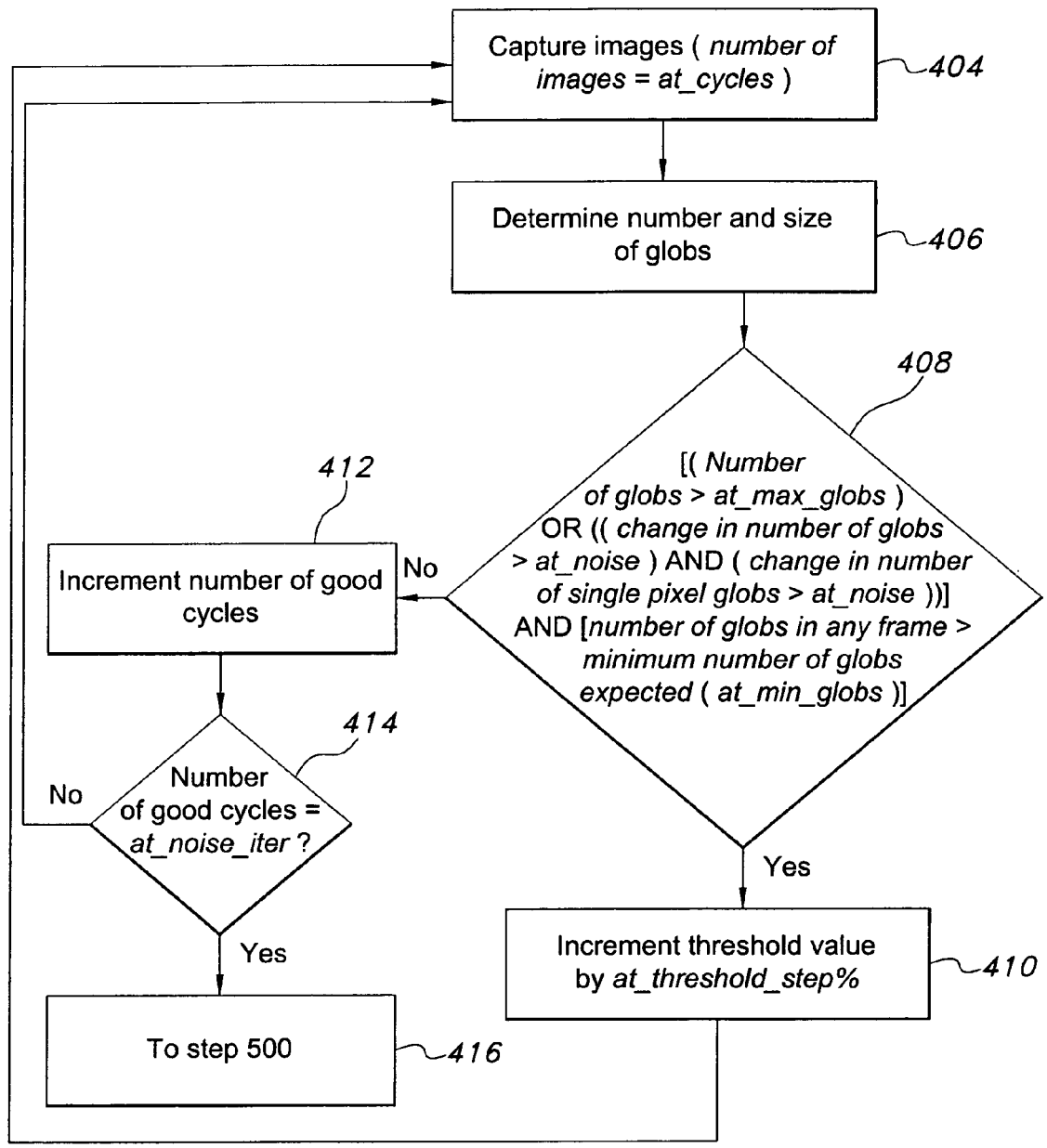
FIG. 4 is a flow diagram illustrating in more detail another portion of the auto thresholding method of FIG. 1, in accordance with an embodiment of the invention.
Figure 5:
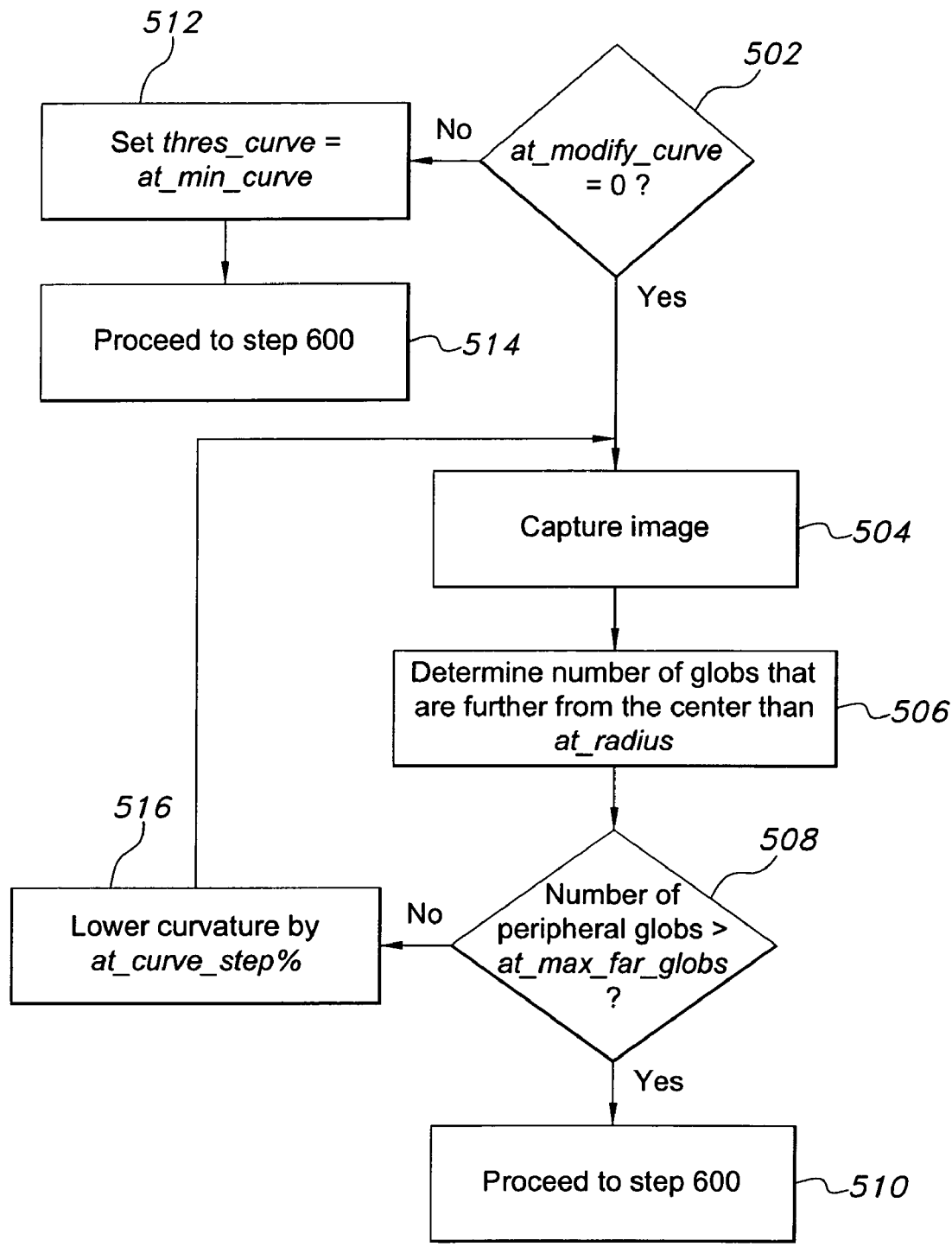
FIG. 5 is a flow diagram illustrating in more detail another portion of the auto thresholding method of FIG. 1, in accordance with an embodiment of the invention.

FIG. 4 illustrates in more detail the step of incrementing the threshold intensity until the noise is limited. In step 404, a number of images are captured. The number of images is equal to the value specified by at_cycles. In step 406, the number and size of the globs in each image is determined. In step 408, the noise is computed for this series of images. In particular, step 408 determines if the number of globs exceeds the expected number of globs (at_max_globs) or if the change in the number of globs exceeds a tolerance specified by at_noise and the change in the number of single pixel globs exceeds the tolerance specified by at_noise; and if the number of globs in any frame exceeds the minimum number of globs (at_min_globs) expected. If so, then there is too much noise and the yes branch is followed to step 410. In step 410, the threshold intensity value is incremented by an amount specified by at_threshold_step % and the method returns to step 404 and repeats.

If the conditions specified in step 408 are not satisfied, then the no branch is followed to step 412 and the number of good cycles is incremented by one. In step 414, the number of good cycles is compared to a predetermined number specified by at_noise_iter. If the number of good cycles is equal to the predetermined number, then the method proceeds to step 416 and continues with step 500. If the number of good cycles does not equal the predetermined number, then the no branch is followed and the method returns to step 404 and repeats.

FIG. 500 provides additional details of the step of lowering the curvature until the peripheral noise is too high. In step 502, a determination is made as to whether the starting curvature value is zero. If so, then the method proceeds to step 504 and an image is captured. In step 506 the number of peripheral globs in the image is determined. A peripheral glob is one that is further from the center than a distance specified by at_radius. In step 508, a determination is made as to whether the number of peripheral globs exceeds a predetermined threshold specified by at_max_far_globs. If so, then the method proceeds to step 510 and continues to step 600.

If the number of peripheral globs does not exceed the predetermined threshold, then the no branch is followed to step 516 where the curvature is lowered by an amount specified by at_curve_step %. The method then returns to step 504 and repeats.

If the starting curvature value, at_modify_curve, is not set to zero, then the no branch is followed from step 502 to step 512. In step 512, the curvature is set to at_min_curve and the method proceeds to step 514 and continues with step 600.

Figure 6:
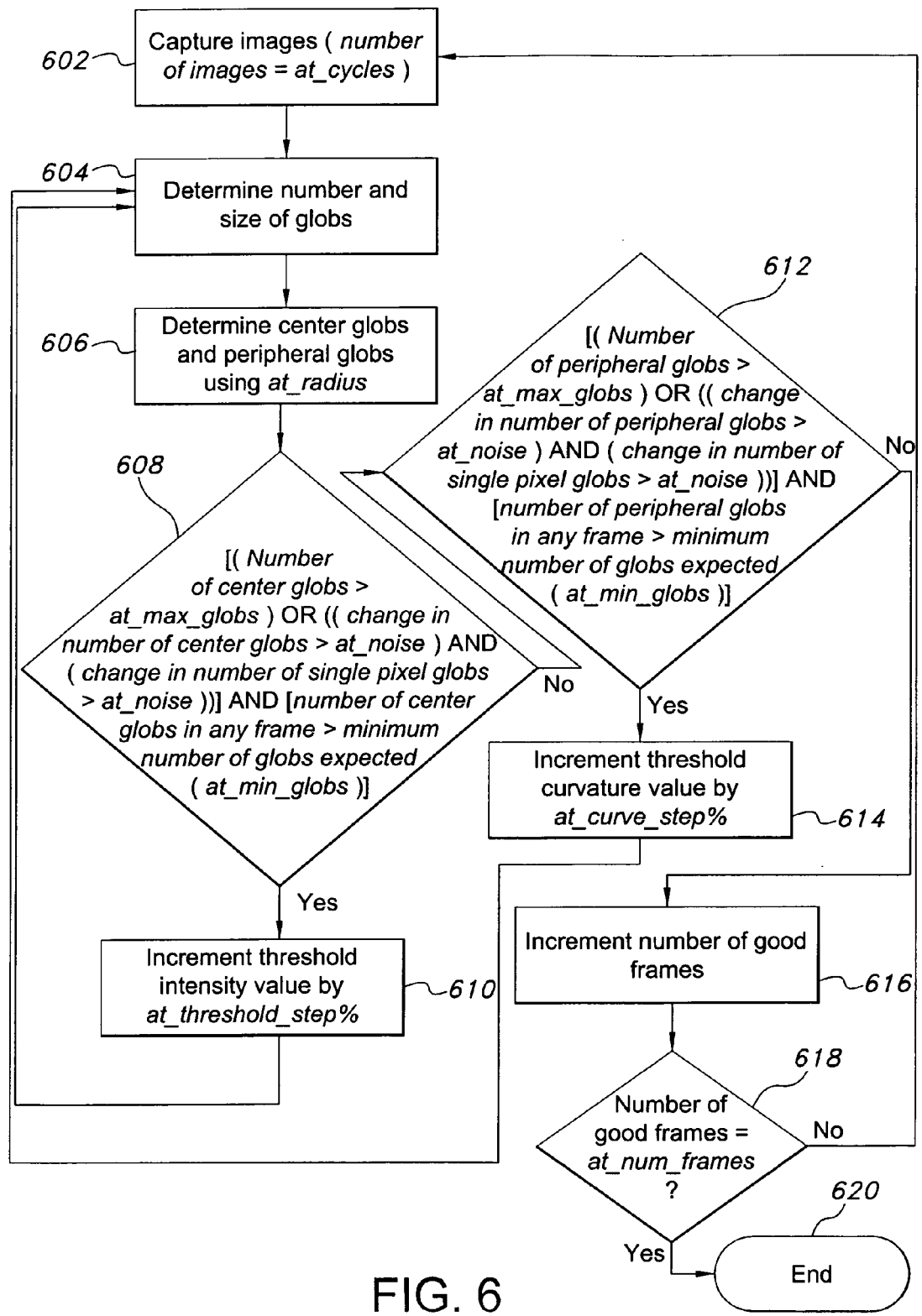
FIG. 6 is a flow diagram illustrating in more detail another portion of the auto thresholding method of FIG. 1, in accordance with an embodiment of the invention.

FIG. 6 provides additional details of the step of incrementing the threshold intensity and curvature until the noise is limited across the field of view. FIG. 6 is similar to FIG. 4, except that both the threshold and the curvature are optimized in FIG. 6. If noise is detected in the center, then the threshold is incremented. If noise is detected in the periphery, then the curvature is incremented.

In step 602, a number of images are captured. The number of images is specified by at_cycles. In step 604, the number and size of the globs are determined and in step 606 the globs are determined to be either center globs or peripheral globs. Step 608 determines whether there is any noise in the center. In particular, step 608 determines if the number of center globs exceeds the expected number of globs (at_max_globs) or if the change in the number of center globs exceeds a noise threshold specified by at_noise and the change in the number of single pixel globs exceeds the noise threshold specified by at_noise; and if the number of center globs in any frame exceeds the minimum number of globs expected (at_min_globs). If so, then there is too much noise and the yes branch is followed to step 610. In step 610, the threshold intensity value is incremented by a predetermined amount specified by at_threshold_step %. The method then returns to step 604 and repeats.

If the conditions in step 608 are not satisfied, indicating that there is no noise in the center, then the no branch is followed to step 612. In step 612, a determination is made as to whether there is noise in the periphery. In particular, step 612 determines if the number of peripheral globs exceeds the expected number of globs (at_max_globs) or if the change in the number of peripheral globs exceeds a noise threshold specified by at_noise and the change in the number of single pixel globs exceeds the noise threshold specified by at_noise; and if the number of peripheral globs in any frame exceeds the minimum number of globs expected (at_min_globs). If so, then there is too much noise and the yes branch is followed to step 614. In step 614, the threshold curvature value is incremented by a predetermined amount specified by at_curve_step.

If the conditions in step 612 are not satisfied, indicating that there is no noise in the periphery, then the method proceeds to step 616. In step 616, a counter indicating the number of good frames is incremented. In step 618, the number of good frames is compared to a threshold specified by at_num_frames. If the number of good frames meets the threshold, then the method proceeds to step 620 and ends. If the number of good frames does not meet the threshold, then the no branch is followed back to step 602 and the method repeats.

Calculating the threshold image is a computationally intensive process since a separate calculation is performed for each pixel. Performing the calculation without using the curvature significantly speeds up the calculation. If the curvature is set to a relatively high value, then the threshold image is calculated without the curvature present. In one embodiment if thresh_curve is set to a value of 4000, which is the maximum allowed and which has the minimal affect on the threshold image, then the threshold image is calculated without the curvature. In this embodiment the first three steps illustrated in FIG. 1 are performed with the curvature set to a value of 4000, thus, performing the calculation without using the curvature. As will be apparent to those skilled in the art, as processing capacity increases, it may be preferable to use the curvature. If so, then the previously described steps would be modified to use the curvature parameter.

Motion Capture

Figure 7:
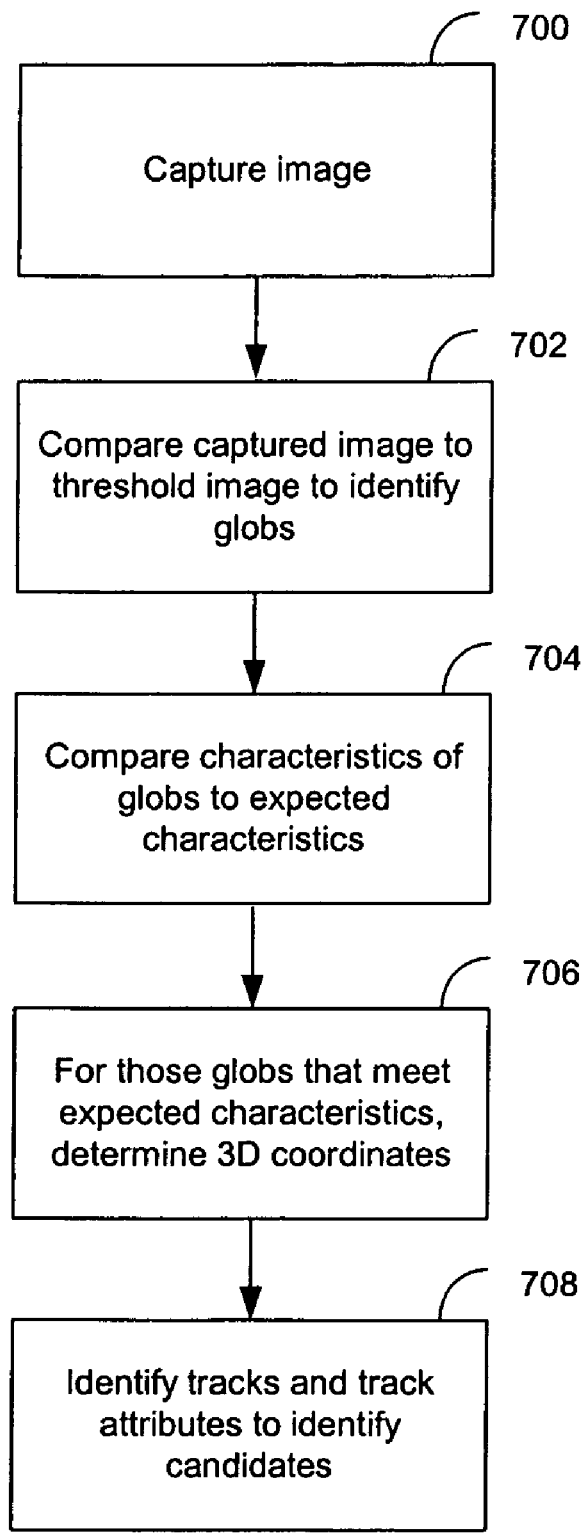
FIG. 7 is a flow diagram illustrating a method for motion capture in accordance with an embodiment of the invention.

To capture the motion of a subject, the cameras capture a series of images. The images are processed to identify the locations of the markers (or the subject) from frame to frame and can be used to animate a graphical model representing the subject's motion. FIG. 7 illustrates the processing of the captured images. In step 700, each camera captures an image. Each captured image is compared to a threshold image to detect globs, in step 702. Once the globs are detected, the globs are evaluated to determine whether the characteristics of the globs satisfy certain predetermined characteristics, in step 704. If so, then the 3 D coordinates for the candidate points corresponding to the globs are calculated using information from all of the cameras in step 706. In step 708, the relative locations of the candidate points are evaluated across frames to identify a track and track attributes in order to identify a candidate for further analysis. In one embodiment, steps 700-704 are performed on the cameras and steps 706-708 are performed on the central computer. However, as the cameras become more powerful, more of the processing will be performed on the cameras. Additional details of the steps are provided below.

Glob Detection

Each image captured by the camera is compared to the threshold image on a pixel-by-pixel basis. The intensity of each pixel of the captured image is compared to the intensity of the pixels of the threshold image. If the intensity of the pixel of the captured image is greater than the intensity of the pixel of the threshold image, then the pixel is marked as a hot pixel. Once all of the pixels are compared, the information is used to generate an RLE (run length encoding). The RLE is a method of describing the locations of all the hot pixels in the captured image. The RLE is a collection of segments, where a segment is defined as a single hot pixel or a series of connected hot pixels on a line. The RLE is stored in such a manner that a line number and the beginning and ending pixels of a segment on the line are encoded together with an index for each segment.

Each line that includes any hot pixels is encoded using a number of shorts (two bytes). The first short corresponds to the line number and the second short corresponds to the number of hot segments in the line. For each hot segment, additional shorts are used to identify the hot segments. The first short is the first hot pixel in the segment, the second short is the last hot pixel in the segment and the third short is the segment index. Shown below is an example.

| Threshold Image | 01 | 02 | 04 | 06 | 06 | 04 | 05 | 06 | 06 | 02 | 50 | 80 | 80 |
|---|---|---|---|---|---|---|---|---|---|---|---|---|---|
| Captured Image | 00 | 01 | 04 | 16 | 20 | 14 | 06 | 04 | 01 | 00 | 60 | 65 | 68 |
| Hot/Cold | C | C | C | H | H | H | H | C | C | C | H | C | C |

The first line of the example shown above represents the pixel intensity of the threshold image and the second line represents the pixel intensity of the captured image. The third line indicates whether the intensity of the pixel of the captured image is greater than the intensity of the corresponding pixel of the threshold image, i.e. the pixel is hot. Assuming that the above lines correspond to line 50, then the information is encoded as follows.

0050 0002 0003 0006 xxxx 0010 0010 xxxx

The first short represents the line number (0050) and the second short represents the number of hot segments (0002). The third short represents the first hot pixel of the first hot segment (0003), the fourth short represents the last hot pixel of the first hot segment (0006), and the fifth short represents the segment index. The first hot segment is four pixels long and begins at pixel 3 and ends at pixel 6. The sixth short represents the first hot pixel of the second hot segment (0010), the seventh short represents the last hot pixel of the second hot segment (0010), and the eighth short represents the segment index. The second hot segment is one pixel long and begins and ends at pixel 10. Since the segment indexes are not yet defined, they are designated as xxxx.

The segment indexes indicate which hot segments are connected. For example, if a hot segment on line 31 begins at pixel 101 and ends at pixel 105 and a hot segment on line 32 includes any pixel from 101 to 105 inclusive, then the two hot segments are connected and are assigned the same index number. Connected hot segments are referred to herein as globs. Each glob is identified by a single index number that is unique for the frame.

In some circumstances, a single glob may be initially identified as two or more globs. Consider for example a "U" shaped glob. Initially the two legs of the U receive different index numbers. However, when the bottom of the U is processed, it is discovered that the two legs are connected. In this situation, the index numbers are modified so that the U-shaped glob is identified by a single index number.

Glob Discrimination

Once the globs are identified, the globs are compared to the characteristics of the markers (if markers are used) or the subject (if markers are not used). For each glob, the number of hot pixels, a bounding box, a fill factor and the center of gravity are calculated. The bounding box is a regularly shaped area, such as a square, that contains the glob and is used to compare the shape of the glob to the shape of the marker or subject. The fill factor is computed by dividing the area of the glob by the area of the bounding box. In one embodiment, the area of the glob is determined by assuming that the glob is roughly circular in shape and calculating the area of a circle.

The center of gravity can be calculated based on whether the pixels are hot or cold or can be based on the grey-scale levels of the pixels. The center of gravity calculation can consider pixels that are below the threshold, but border a hot pixel. Consider a glob consisting of a single hot pixel located at (100, 100) with bordering intensities as shown below. The threshold intensity for the corresponding threshold image is 50.

|  | 099 | 100 | 101 |
|---|---|---|---|
| 099 | 4 | 4 | 4 |
| 100 | 5 | 60 | 45 |
| 101 | 4 | 10 | 4 |

If only the hot pixel is considered, then the center of gravity is calculated as (100, 100). However, if the bordering pixels are considered, then the center of gravity is calculated as (100.286, 100.043).

The characteristics of the globs are compared to the expected characteristics of the markers or subjects. For example, the size of a glob (number of hot pixels) is compared to the expected size of a marker. If the glob is too small or too big, then it is discarded from further processing. In addition, the shape of the glob (the bounding box of the glob) is compared to the expected shape or proportions of a marker. In one embodiment, if the bounding box is elongated more than a predetermined amount (e.g. width is more than three times height), then the glob is discarded, since the markers are round spheres. In this embodiment, an oblong or elongated bounding box likely results from reflections from shiny surfaces, such as door or window frames.

The fill factor of the glob is also compared to an expected fill factor. In one embodiment, a fill factor of between 40% and 60% is used. The fill factor is used to eliminate globs that are hollow or diagonally elongated. The criteria for size, shape and fill factor are based on the known characteristics of the markers or subject and thus, will differ based on the markers or subject to be captured. Additional criteria may also be used depending upon the characteristics of the marker or subject. If the characteristics of the glob meet the expected characteristics, then the glob is identified for further processing.

3 D Location

Glob detection is performed on a frame-by-frame basis for each image generated by each camera. A set of globs, $G_c$, is generated for each frame from each camera. To determine the 3 D coordinates for the candidate points corresponding to the globs, a set of 3 D rays $R_c$ is constructed from each set of globs. The form of each image ray R is:

$$R=P_R+d*D_R$$

where $P_R$ is the origin of the ray (the camera position).

$D_R$ is the normalized direction of the ray.

d is a distance (to be determined via triangulation) that the point is along the ray.

Triangulation, with a specified error tolerance (typically 0.8) of the rays $R_c$ across all cameras gives a set of 3 D points, $M_r$. The points, $M_r$, represent candidate points and areas of interest in the scene. These points are further evaluated based on their relative movement from frame to frame.

Candidate Identification

Over time frames t1, t2, . . . , tn, a sequence of marker sets, $M_{t1}, M_{t2}, \ldots, M_{tn}$, is generated. The relative locations of the marker sets from frame to frame are evaluated to identify tracks and track attributes. For example, a point in one marker set is compared to a point in a subsequent marker set to determine the "closeness" of the positions. If the points are close, then the points may be deemed to be part of the same track and a track number is assigned to the points. The criteria used to evaluate closeness, such as the relative positions from frame to frame, the number of consecutive frames of closeness, the number of frames without closeness, etc., are based on the object or subject that is being captured. Once a track, Ti, is identified, the track is assigned a type, such as car or person, based on the values of the various attributes of the track. The tracks that are assigned a type that corresponds to the object or subject of interest are identified as candidates.

Markerless Tracking

Markers are not suitable for certain objects, such as balls, since they may interfere with the subject's interaction with the object. For example, placing markers on a baseball is likely to interfere with the pitching motion of a pitcher. Therefore, the system can capture the motion of an unmarked object by locating globs with characteristics that correspond to the known characteristics of the object. If the captured motion includes a subject fitted with markers and an unmarked object, such as a ball, then there are separate glob detection parameters defined for the markers and the unmarked object.

In one embodiment, the parameters for an unmarked object, such as a ball, include a region of interest, a minimum area, a maximum area, an aspect ratio, a maximum intensity, a threshold and a shutter speed. The region of interest parameters are defined to include the expected location of the object. Typically the region of interest is a regularly shaped region, such as a square. The minimum area and the maximum area specify the expected size of the object and the aspect ratio specifies the expected proportions of the object. The threshold parameter defines an intensity value for the region of interest within the threshold image. The maximum intensity specifies a maximum intensity for the glob. Since an unmarked object is not as bright as a marker, a lower threshold intensity is used for the threshold image and the maximum intensity for the glob is lower than expected intensity for a marker.

In an embodiment that only uses markerless tracking, the shutter speed is longer than the shutter speeds used for marker-based tracking. In an embodiment that combines marker-based tracking and markerless tracking, the shutter speed is the shutter speed used for marker-based tracking. The unmarked object is tracked by comparing the captured image to the previously captured image with an offset. The previously captured image plus the offset acts as the threshold image for the unmarked object. The offset is typically in the order of six to twelve grey scale values due to the fast shutter speeds overall dark images. Thus, two RLEs are generated for combined marker-based and markerless tracking, one for tracking the markers and a second for tracking the unmarked objects.

The number and type of parameters are based on the known characteristics of the unmarked object and thus, will differ based on the object to be captured. Additional methods for tracking an object without the use of markers are possible and include the head tracking method described in U.S. patent application Ser. No. TBD entitled "System and Method for Motion Capture," which is incorporated herein by reference.

Additional alternative embodiments will be apparent to those skilled in the art to which the present invention pertains without departing from its spirit and scope. In particular, the parameters described herein are exemplary and additional or alternative parameters can be used. The invention can be used with multiple sets of parameters for simultaneously tracking different types of objects. The objects can include a combination of objects with markers and objects without markers. Markerless tracking is not limited to balls or person's heads, but can be applied to any type of subject. The image processing described herein can be performed on the central computer or on the cameras depending upon the particular hardware configuration used. Accordingly, the scope of the present invention is described by the appended claims and is supported by the foregoing description.

What is claimed is:

1. A method for capturing motion, comprising:
   receiving a captured image having a plurality of pixels arranged in rows and columns;
   for each pixel of the captured image, comparing an intensity of the pixel of the captured image to an intensity of a corresponding pixel in a threshold image;
   if the intensity of the pixel of the captured image exceeds the intensity of the corresponding pixel in the threshold image, then designating the pixel of the captured image as a hot pixel;
   comparing hot pixels in adjacent rows to determine related hot pixels;
   designating the related hot pixels as a glob;
   comparing characteristics of the glob with predetermined characteristics of an item to track the motion associated with the item; if the characteristics of the glob satisfy the predetermined characteristics of the item, then determining three dimensional coordinates for candidate points corresponding to the glob;
   determining track attributes for the candidate points, wherein the track attributes describe the candidate point's movement from frame to frame;
   comparing the track attributes for the candidate points to expected attributes of the motion of the item; and
   if the track attributes satisfy the expected attributes, then determining that the candidate points correspond to the item.

2. The method of claim 1 wherein the item is a reflective marker.

3. The method of claim 1, wherein the item is an object.

4. A method for capturing a background image, comprising:
- for each of a plurality of cameras,
  - capturing a plurality of images over a period of time using a predetermined shutter speed, wherein each image has a plurality of pixels;
  - for each pixel of a selected captured image,
    - comparing an intensity of the pixel with an intensity of a corresponding pixel of other ones of the captured images;
    - determining a maximum intensity of the pixels; and
    - using the maximum intensity of the pixels as the intensity for the corresponding pixel of the background image; capturing a second plurality of images over a second period of time using a second predetermined shutter speed;
- for each pixel of the second captured images comparing an intensity of the pixel with a predetermined intensity threshold;
- if the pixel satisfies the predetermined intensity threshold, then setting the corresponding pixel in the background image to the predetermined intensity threshold.

5. A method for capturing motion associated with a first item, wherein the first item is associated with a marker and a second item, wherein the second item is not associated with a marker, comprising:
- receiving a captured image having a plurality of pixels arranged in rows and columns;
- comparing the captured image to a threshold image on a pixel-by-pixel basis;
- based on the comparison, identifying globs within the captured image;
- comparing the globs to a first set of criteria, wherein the first set of criteria correspond to characteristics of the marker;
- comparing the globs to a second set of criteria, wherein the second set of criteria correspond to characteristics of the second item;
- based on the comparison to the first set of criteria and the second set of criteria, identifying any globs that correspond to the marker and identifying any globs that correspond to the second item to track the motion of the marker and the second item; wherein a region of interest defines an expected range of locations for the second item, and wherein comparing the captured image to a threshold image on a pixel-by-pixel basis, comprises:
- for each pixel of the captured image, comparing an intensity of the pixel of the captured image to an intensity of a corresponding pixel in the threshold image; and
- for each pixel of the captured image that corresponds to the region of interest, comparing the intensity of the pixel of the captured image to a predetermined intensity associated with the second item.

6. A method for creating a threshold image, comprising:
- determining a center of an image for curvature falloff;
- lowering a threshold intensity until detected noise exceeds a predetermined threshold;
- raising the threshold intensity until the detected noise satisfies a second predetermined threshold;
- lowering a threshold curvature until detected peripheral noise exceeds a third predetermined threshold; and
- raising the threshold intensity and the threshold curvature until the detected noise satisfies a third predetermined threshold corresponding to noise in the center of the image and the detected peripheral noise satisfies a fourth predetermined threshold that corresponds to peripheral noise in the image,
- wherein determining the detected noise and the peripheral noise includes determining a number of globs in the image and comparing the globs to certain thresholding parameters.

7. The method of claim 6, wherein raising the threshold intensity and the threshold curvature comprises:
- raising the threshold intensity to limit noise in the center of the image; and
- raising the curvature to address noise in the periphery of the image.

* * * * *